Figure 1:
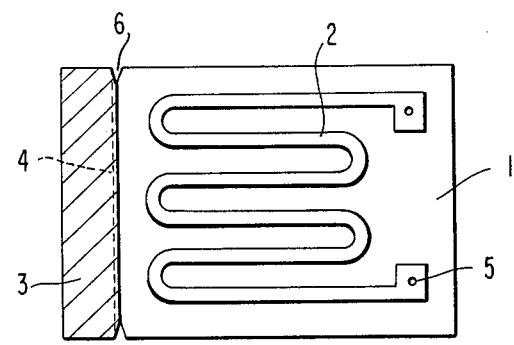

United States Patent [19]

Sieder

[11] 4,086,554
[45] Apr. 25, 1978

[54] STRAIN GAUGE
[75] Inventor: Wolfgang Sieder, Waiblingen-Beinstein, Germany
[73] Assignee: Daimler-Benz Aktiengesellschaft, Germany
[21] Appl. No.: 740,668
[22] Filed: Nov. 10, 1976
[30] Foreign Application Priority Data
Nov. 12, 1975 Germany .............................. 2550669
[51] Int. Cl.² ............................................... G01L 1/22
[52] U.S. Cl. ....................................... 338/2; 73/150 A
[58] Field of Search ................ 338/2, 5, 6; 73/150 A; 116/114 R

[56] References Cited
U.S. PATENT DOCUMENTS
2,899,658   8/1959   Bean, Jr. .................................... 338/2
3,296,856   1/1967   Elias .................................... 73/150 A

OTHER PUBLICATIONS

L. C. Penick, Device for Testing Adherence of Circuit Elements to a Substrate, Western Electric Technical Digest No. 37, p. 37, Jan. 1975.

Primary Examiner—C. L. Albritton
Attorney, Agent, or Firm—Craig & Antonelli

[57] ABSTRACT

A strain gauge adapted to be adhesively mounted on a structural part in a place to be tested which is provided with at least one measuring grid and to the connecting ends of which are soldered measuring lines for conducting the current from the measuring grid; an extension of the carrier for the grid foil is provided along one edge of the strain gauge and is connected with the main carrier by a perforation.

6 Claims, 3 Drawing Figures

STRAIN GAUGE

The present invention relates to a strain gauge adapted to be adhesively mounted on a place to be tested and having at least one so-called measuring grid, to the connecting ends of which are soldered measuring lines for conducting therethrough the current flowing through the measuring grid. The measuring grids consist of meander-shaped thin metallic foil strips which are mounted on a carrier or base consisting of a synthetic plastic film or foil. The electric resistance of the metallic strips is changed by their elongation and by a change in their crystalline structure. This resistance change is an indication for the extent of the elongation and therewith of the strain which can be picked up electrically by means of amplification.

Resistive strain gauges are glued onto the structural parts to be tested by means of different glues or adhesive materials depending on the requirements as regards the measurement. After the strain gauge strips are glued on, the ends of measuring lines for conducting therethrough the picked up current, are carefully soldered to the specially reinforced connecting ends of the measuring grid.

Occasionally, as a result of special circumstances, the adhesive strength of the glue or adhesive material may not be sufficient. This inadequacy may have different causes, such as, for example, a surface of the base or carrier unsuitable for the application of a glue or adhesive material. This surface may, for example, be greasy or moist. Also, the glue or adhesive material may have become non-usable as a result of moisture or old-age. Even with an excessive air humidity, the glue or adhesive material may lose in adhesiveness during the gluing-on operation which is possible, for example, during the summer in case of non-air-conditioned spaces and with high air-humidity. Also an inadequately or incorrectly prepared surface of the structural part to be tested may be the cause for an inadequate adhesion. Also the structural part may be too greasy or too moist.

It is the aim of the present invention to provide a strain gauge whose adhesiveness can be tested after the application and sufficient hardening of the glue or adhesive material, without damaging the strain gauge, as such, or to change its functioning ability.

The underlying problems are solved according to the present invention in that an extension of the carrier or base for the grid foil is provided at one edge of the strain gauge, which is connected with the main carrier by a perforation. The carrier of the metallic grid foil is therefore extended by a small piece which can be scraped off from the workpiece to be tested after it is securely glued or bonded to the carrier. If the adhesive connection is good, then the carrier must be so well connected with the test piece that the extension can be removed from the workpiece only by scraping it off in small crumbs. In addition to the perforation, wedge-shaped notches or cut-ins may further serve for the prevention of the damage of the main carrier, which are provided at the two peripheral points of the perforation. Appropriately, the adhesion-test carrier-extension is provided at an edge of the strain gauge disposed opposite the connecting ends. As a result thereof, the test can still be carried out when the cable connections have already been realized. Generally, however, the test in accordance with the present invention will be carried out prior to the cable connection since with a negative result of the test, the difficult and time-consuming work of the soldering of the cable ends to the partly minute places of the connecting ends of the measuring grid as well as the covering are not carried out unnecessarily. If one does not have sufficient space, the extension may also have a lesser width than the strain gauge edge, at which it is secured. Additionally, safety is assured thereby to an even greater extent for the fact that only the test strip is separated and therebeyond the main carrier or even the measuring grid is not also damaged.

Accordingly, it is an object of the present invention to provide a strain gauge which avoids by simple means the aforementioned shortcomings and drawbacks encountered with the prior art devices.

A further object of the present invention resides in a resistive strain gauge which can be readily tested for the adequacy of the adhesiveness of the gluing or bonding agent, by means of which it is affixed to the workpiece to be tested.

A further object of the present invention resides in a strain gauge of the type described above which permits a simple test as to the sufficiency of the adhesion onto the workpiece to be tested without danger of damage to the strain gauge itself.

A still further object of the present invention resides in a strain gauge of the type described above which permits the execution of a test as to the adequacy of the adhesion on the workpiece to be tested, even when spatial conditions are restricted.

Figure 2:
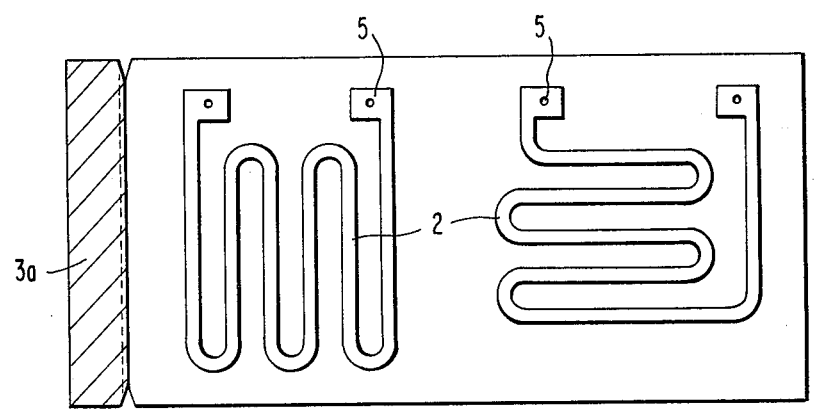
Figure 3:
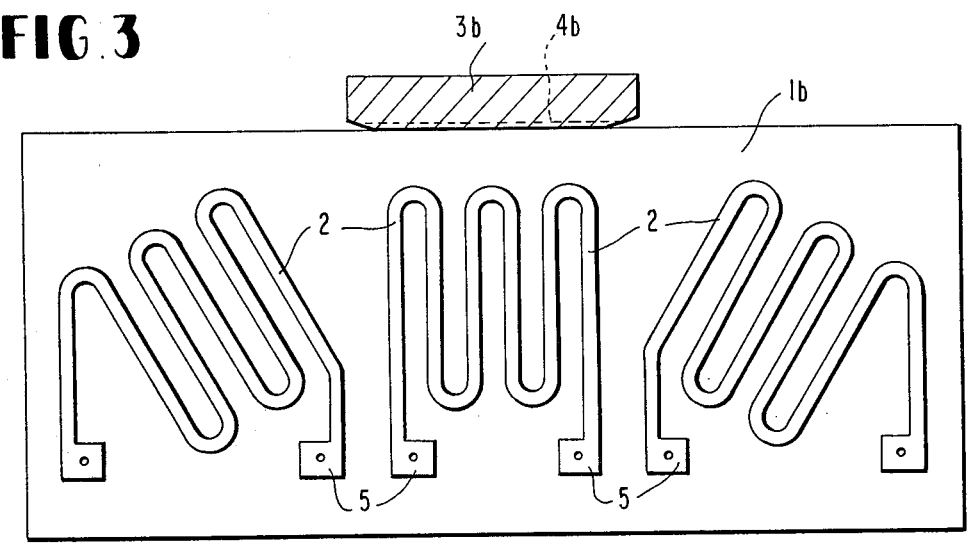

These and other objects, features and advantages of the present invention will become more apparent from the following description when taken in connection with the accompanying drawing which shows, for purposes of illustration only, several embodiments in accordance with the present invention and wherein:

FIG. 1 is a plan view on a strain gauge with a measuring grid and with a main carrier as well as with a lateral extension for the adhesion test in accordance with the present invention; and FIGS. 2 and 3 are plan views on two further embodiments of so-called rosettes consisting of strain gauges with more than one measuring grid that may be arranged in different directions, which are provided with extensions in accordance with the present invention at the edges of the main carrier opposite the connecting ends for the cables.

Referring now to the drawing wherein like reference numerals are used throughout the various views to designate like parts and more particularly to FIG. 1, a strain gauge having a main base or carrier 1 and a measuring grid 2 mounted thereon as well as an extension 3 is illustrated in this figure. In reality, such a strain gauge includes edges whose lengths correspond only to a fraction of a centimeter. A separating line 4 between the extension 3 and the main carrier 1 must be perforated sufficiently strongly so that a damaging of the main carrier 1 is avoided under all circumstances when scraping off the extension 3. The scraping off is preferably carried out with a small knife and provides information concerning the quality of the adhesive connection which is sufficiently good, when the extension 3 can be scraped off only in crumbs. A clearly noticeable marking of the carrier extension 3 is also achieved by the perforation 4, which is absolutely necessary with the small dimensions which a strain gauge may have, in order not to reach the area of the main carrier 1 during the scraping-off operation. The adhesion test is undertaken after the adhesive material has completely hardened, appropriately also prior to the further application operations, especially prior to the soldering of the measuring line ends to the connecting ends 5 of the measuring grid 2. It is also possible as a result of the perforation 4 to separate the auxiliary carrier 3 from the main carrier 1 in the glued-on condition prior to the scraping-test in order to preclude in every case the danger of a damage of the main carrier, or if the auxiliary carrier would interfere at the structural part for reasons of lack of space.

Appropriately, notches 6 are provided at the ends of the perforated separating line 4 which further facilitate the separation of the extension 3 and which still further reduce thereby the danger of damage of the main carrier 1 during the scraping test. It can also be seen from FIG. 1 that the extension 3 is appropriately provided at an edge opposite to the connecting ends 5.

Other strain gauges, so-called rosettes, are illustrated in FIGS. 2 and 3. One refers to those strain gauges as rosettes, on which more than one measuring grid are provided, whereby the individual loops of the measuring grids extend in different directions. Care is again taken in this case that the extensions 3a (FIG. 2) and 3b (FIG. 3) are provided at one of the edges which is not adjacent to the connecting ends 5 of the measuring grids. An extension 3b is illustrated in FIG. 3 which has a smaller length than the edge, at which it is provided. This length of the extension 3b is completely sufficient in order to be able to carry out the adhesion test. The shortness of the separating line 4b assures to an even greater extent than with a longer separating line that the main carrier 1b is not damaged.

If an adhesion test is not to be carried out, or is not required, or if the spatial conditions at the structural part leave no longer any space for the extension, it is possible to cut off the extension strip easily from the strain gauge prior to the application thereof.

A control of the adhesive strength of the adhesive connection of a freshly glued-on strain gauge is practically possible only with destruction of a part of the carrier by a scrape test. The so-called erasure test, in which one applies pressure on the strain gauge by means of an eraser, is not suitable for the recognition of an insufficient adhesive strength. It can merely serve to determine bubbles or a carrier which does not adhere at all. The strain gauges are sometimes very small. To carry out a scrape test in the heretofore known strain gauges, was therefore possible only rarely without impairing the function of the strain gauge and of the measuring grid. Consequently, the control by scrape tests has been omitted heretofore and an inadequate adhesion was determined only by the measurement which was carried out only later on so that in that case the entire application, i.e., the gluing-on of the strain gauge onto the workpiece and the difficult soldering-on of the measuring line ends to the small connecting ends of the measuring grid had to be repeated. This considerable increased expenditure in time and costs can be economized by the present invention. A test for the correct and good adhesion of the glue or adhesive material can be carried out by means of the extension and the scrape test adapted to be carried out exclusively on the same, without damaging the main carrier and therewith the measuring grid mounted thereon. If a strain gauge in fact should not be glued-on well, then this failure can be recognized timely and with certainty prior to very-time consuming operations, especially prior to the difficult soldering operations, and the causes of this poor adhesion can be eliminated.

The present invention can be applied with all average and larger simple strain gauges and also with rosettes and strain gauges of any suitable construction such as special strain gauges. In connection with the latter, the most favorable place of the provision of the extension has to be determined in each case according to points of view of manufacture.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A strain gauge adapted to be adhesively mounted on a place to be tested, which includes a main carrier means and a measuring grid means having connecting ends for the connection thereto of measuring lines, characterized in that an extension of the carrier means is provided along one edge of the strain gauge, said extension being readily detachably connected with the main carrier means by a perforation.

2. A strain gauge according to claim 1, characterized in that the strain gauge is provided with wedge-shaped notches at both ends of the perforation.

3. A strain gauge according to claim 2, characterized in that the extension is provided at an edge of the strain gauge opposite the connecting ends.

4. A strain gauge according to claim 3, characterized in that the extension has a lesser width than the edge, along which it is secured.

5. A strain gauge according to claim 1, characterized in that the extension is provided at an edge of the strain gauge opposite the connecting ends.

6. A strain gauge according to claim 1, characterized in that the extension has a lesser width than the edge, along which it is secured.

* * * * *